(12) United States Patent
Furuta

(10) Patent No.: US 11,561,744 B2
(45) Date of Patent: Jan. 24, 2023

(54) SERVER AND PRINTING SYSTEM

(71) Applicant: SEIKO EPSON CORPORATION, Tokyo (JP)

(72) Inventor: Yasuhiro Furuta, Shimosuwa-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/397,069

(22) Filed: Aug. 9, 2021

(65) Prior Publication Data
US 2022/0050645 A1    Feb. 17, 2022

(30) Foreign Application Priority Data

Aug. 11, 2020  (JP) .................. JP2020-135714

(51) Int. Cl.
    *G06F 3/12*    (2006.01)
(52) U.S. Cl.
    CPC .......... *G06F 3/1209* (2013.01); *G06F 3/1208* (2013.01); *G06F 3/1236* (2013.01); *G06F 3/1288* (2013.01)
(58) Field of Classification Search
    CPC .... G06F 3/1209; G06F 3/1208; G06F 3/1236; G06F 3/1288
    USPC ...................................... 358/1.13
    See application file for complete search history.

(56) References Cited

U.S. PATENT DOCUMENTS

| | | | | |
|---|---|---|---|---|
| 8,508,802 B2* | 8/2013 | Igarashi | ............... | H04N 1/4433 |
| | | | | 358/1.14 |
| 8,982,365 B2* | 3/2015 | Choi | ............... | G06K 15/00 |
| | | | | 358/1.14 |
| 10,082,994 B1* | 9/2018 | Ruiz | ............... | H04N 1/00244 |
| 2012/0284395 A1* | 11/2012 | Miyashita | ........... | H04L 41/0816 |
| | | | | 709/224 |
| 2019/0196765 A1* | 6/2019 | Kadota | ................ | G06F 3/1288 |
| 2019/0278530 A1* | 9/2019 | Miyabe | ................ | G06F 3/1209 |

FOREIGN PATENT DOCUMENTS

JP   2011076437 A   4/2011

* cited by examiner

*Primary Examiner* — Allen H Nguyen
(74) *Attorney, Agent, or Firm* — Chip Law Group

(57) ABSTRACT

A server includes: a first interface performing communication based on a predetermined protocol with a client; a second interface performing communication based on a USB standard with a printing device having at least one paper feeder; a controller; and a storage. The controller performs control to acquire medium information of a medium stored in the paper feeder of the printing device, via the second interface, and store the medium information in the storage. When receiving an acquisition request for the medium information from the client, the controller performs control to transmit the medium information read out from the storage to the client via the first interface.

10 Claims, 14 Drawing Sheets

| PAPER FEEDER | SIZE | TYPE |
|---|---|---|
| C1 | A4 | REGULAR PAPER |
| C2 | L SIZE | PHOTOGRAPHIC PAPER |
| C3 | A4 | REGULAR PAPER |
| C4 | A5 | REGULAR PAPER |

| PRINTING DEVICE | CONNECTION INFORMATION | MEDIUM INFORMATION | VERSION INFORMATION |
|---|---|---|---|
| P1 | P1,Port1,⋯ | Media1 | V1 |
| P2 | P2,Port2,⋯ | Media2 | V2 |
| ⋮ | ⋮ | ⋮ | ⋮ |

SERVER AND PRINTING SYSTEM

The present application is based on, and claims priority from JP Application Serial Number 2020-135714, filed Aug. 11, 2020, the disclosure of which is hereby incorporated by reference herein in its entirety.

BACKGROUND

1. Technical Field

The present disclosure relates to a server and a printing system.

2. Related Art

According to the related art, a device server such as a print server is broadly known. The device server acquires information about a device coupled thereto using a USB (Universal Serial Bus) or the like and provides a function implemented by the device to a client on a network, based on the acquired information.

For example, JP-A-2011-76437 discloses a communication control method for the case where a device is shared by client PCs (personal computers) on a network.

In the technique of JP-A-2011-76437, the device server can provide information about a device such as a printing device to a client PC. However, the device server of JP-A-2011-76437 does not provide a dynamically changing state. The dynamically changing state includes medium information such as paper size.

SUMMARY

An aspect of the present disclosure relates to a server including: a first interface performing communication based on a predetermined protocol with a client; a second interface performing communication based on a USB standard with a printing device having at least one paper feeder; a control unit controlling the first interface and the second interface; and a storage unit. The control unit performs control to acquire medium information of a medium stored in the paper feeder of the printing device, via the second interface, and store the acquired medium information in the storage unit. When receiving an acquisition request for the medium information from the client via the first interface, the control unit performs control to read out the medium information from the storage unit and transmit the read-out medium information to the client via the first interface.

Another aspect of the present disclosure relates to a printing system including: a printing device having at least one paper feeder; and a server. The server includes: a first interface performing communication based on a predetermined protocol with a client; a second interface performing communication based on a USB standard with the printing device; a control unit controlling the first interface and the second interface; and a storage unit. The control unit performs control to acquire medium information of a medium stored in the paper feeder of the printing device, via the second interface, and store the acquired medium information in the storage unit. When receiving an acquisition request for the medium information from the client via the first interface, the control unit performs control to read out the medium information from the storage unit and transmit the read-out medium information to the client via the first interface.

DESCRIPTION OF EXEMPLARY EMBODIMENTS

A preferred embodiment of the present disclosure will now be described in detail. The embodiment described below should not unduly limit the content described in the appended claims. Not all the components described in the embodiment are necessarily essential components.

1. System Configuration

Figure 1:
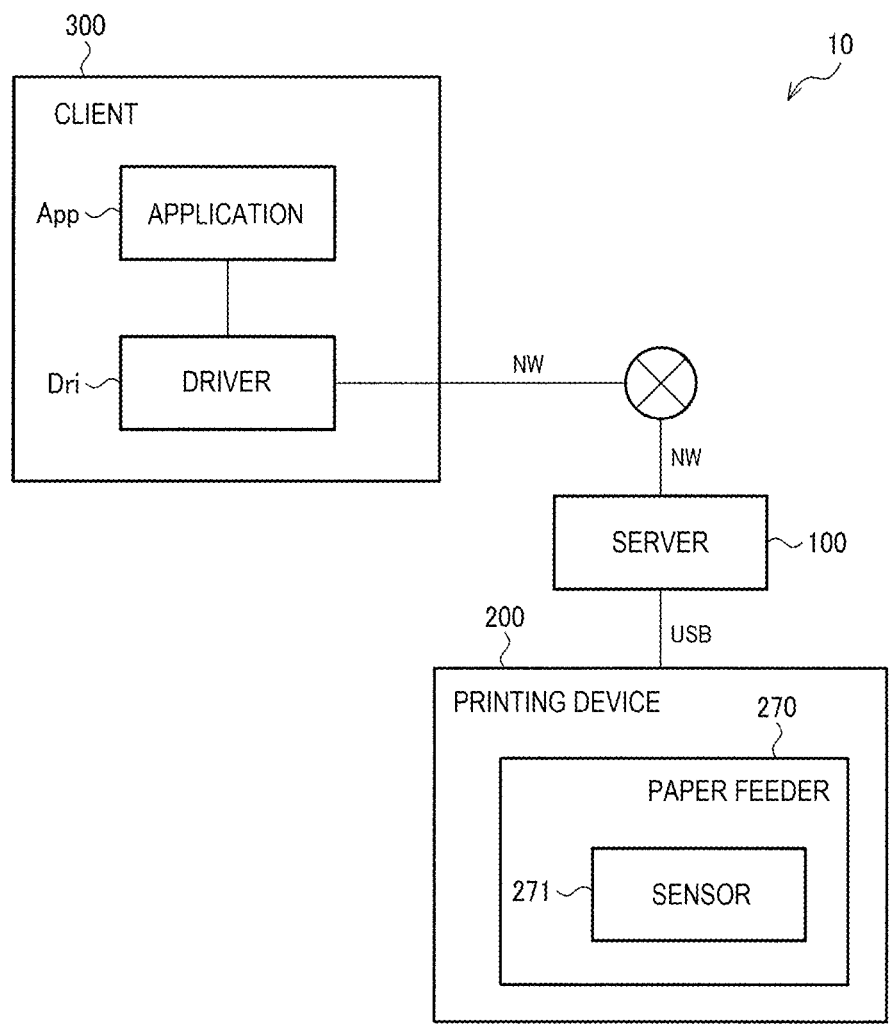
FIG. 1 shows an example of the configuration of a printing system including a server.

FIG. 1 explains an example of the configuration of a printing system 10 including a server 100 according to this embodiment. As shown in FIG. 1, the printing system 10 includes the server 100 and a printing device 200. The server 100 is coupled to a client 300 via a network NW.

The server 100 is a device server, and in a narrow sense, a printer server coupled to the printing device 200. The printing device 200 is a device having a print function. The printing device 200 may be a multifunction peripheral (MFP) having a plurality of functions including a print function. The client 300 is a portable terminal such as a smartphone or a tablet terminal. The client 300 may be an information processing device such as a PC.

On the client 300, software such as an application App and a driver Dri operates. For example, the application App calls an API (application programming interface) of the driver Dri and thus requests the acquisition of a print setting or the execution of printing. To execute the request from the application App, the driver Dri communicates with the server 100 via the network NW.

The server 100 is coupled to the printing device 200 via a USB and is coupled to the client 300 via the network NW.

More specifically, the server 100 communicates with the client 300, using a predetermined protocol. To execute a request from the client 300, the server 100 transmits a command to the printing device 200 via the USB and processes a response.

The printing device 200 responds with information or executes printing, based on a command from the server 100. The printing device 200 includes a paper feeder 270. The paper feeder 270 is provided with a sensor 271. The printing device 200 can detect that a medium is set, based on an output from the sensor 271. The sensor 271 may also be able to detect the size of the medium.

The printing system 10 is not limited to the configuration shown in FIG. 1 and can be implemented with various modifications such as adding another component. For example, a plurality of clients 300 and printing devices 200 may be provided. Also, the software on the client 300 may be configured differently, for example, in such a way that the application App communicates with the server 100 without using the driver Dri. Modifications such as the omission or addition of a component can also be made to FIGS. 2 to 4 and the like, described later.

Using the configuration shown in FIG. 1 enables the function of the printing device 200 to be provided to the client 300 coupled via the network NW. Particularly, even when the printing device 200 does not support a predetermined communication protocol, the server 100 can execute communication using this protocol and therefore the client 300 can use the printing device 200 as a device providing a print function using this protocol.

However, depending on the protocol, medium information may be essential. Also, depending on the protocol, using medium information can improve convenience though the medium information is not essential. The medium information in this case is information about a medium on which the printing device 200 is to form an image. The medium information includes size information and type information about the medium. The size information is information representing the size of the medium such as A4, A5, or L size. The type information is information representing the type of the medium such as regular paper or photographic paper. While an example where the medium is a paper is described below, the medium may include other media such as cloth, film or PVC (polyvinylchloride).

The related-art technique of JP-A-2011-76437 or the like does not disclose a technique for the device server to collect and provide the medium information of the printing device 200, which is dynamically changing information. The related-art technique does not take into account the relationship between a protocol and essential or useful information for the protocol, either. Therefore, the related-art device server cannot provide the function of the printing device 200, for example, based on a protocol for which the medium information is essential. Even if the related-art device server can provide the function of the printing device 200 based on the foregoing protocol, it is difficult to increase convenience.

Meanwhile, the server 100 according to this embodiment acquires medium information of the printing device 200 and provides the medium information to the client 300. An example of the configuration of the server 100, the printing device 200, and the client 300 will now be described with reference to FIGS. 2 to 4.

Figure 2:
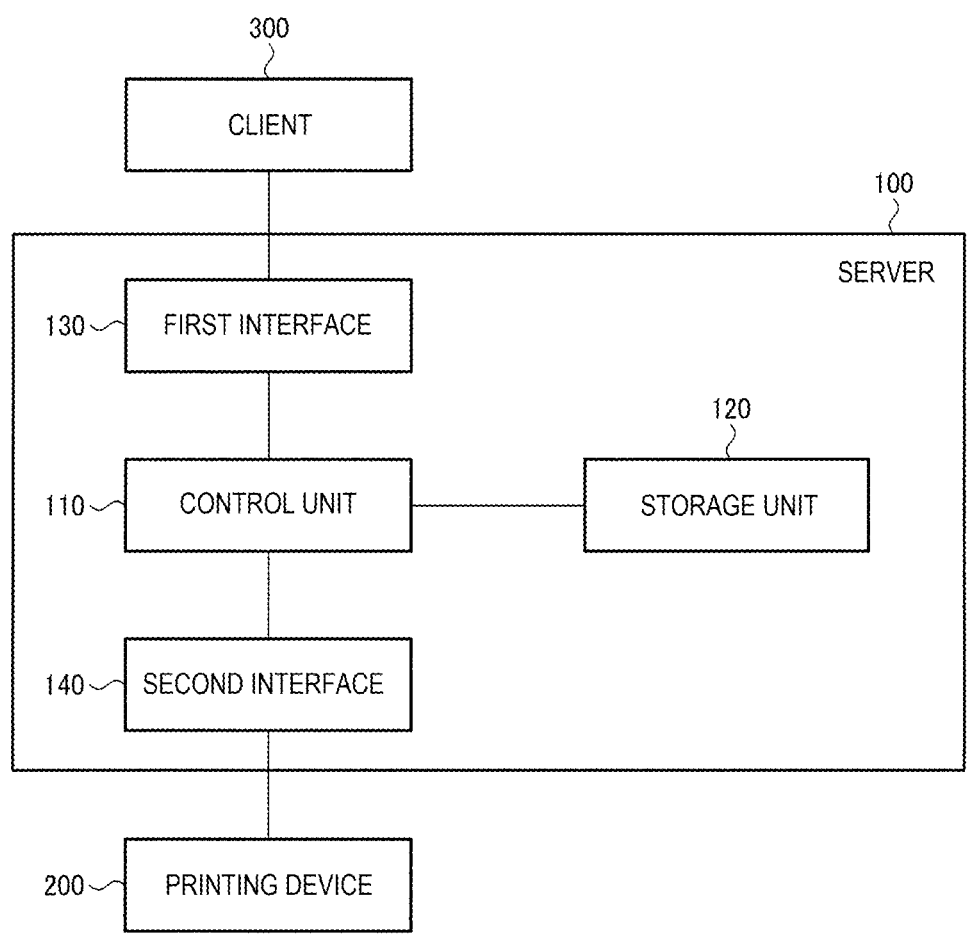
FIG. 2 shows an example of the configuration of the server.

FIG. 2 shows an example of the configuration of the server 100. The server 100 includes a control unit 110, a storage unit 120, a first interface 130, and a second interface 140.

The control unit 110 performs communication control for the first interface 130 and the second interface 140. The control unit 110 also controls writing to and reading from the storage unit 120. Specifically, the control unit 110 is a processor or a controller.

The control unit 110 in this embodiment is formed of hardware described below. The hardware can include at least one of a circuit processing a digital signal and a circuit processing an analog signal. For example, the hardware can be formed of one or a plurality of circuit devices or one or a plurality of circuit elements installed at a circuit board. The one or plurality of circuit devices is, for example, an IC (integrated circuit), an FPGA (field-programmable gate array) or the like. The one or plurality of circuit elements is, for example, a resistor, a capacitor or the like.

The control unit 110 may also be implemented by a processor described below. The server 100 in this embodiment includes a memory storing information and a processor operating based on the information stored in the memory. The memory in this case may be the storage unit 120 or another memory. The information is, for example, a program and various data or the like. The processor includes hardware. As the processor, various processors such as a CPU (central processing unit), a GPU (graphics processing unit), and a DSP (digital signal processor) can be used. The memory may be a semiconductor memory such as an SRAM (static random-access memory) or a DRAM (dynamic random-access memory), a register, a magnetic storage device such as a hard disk device, or an optical storage device such as an optical disc device. For example, the memory stores a computer-readable command and the processor executes the command, thus implementing the function of the control unit 110 as processing. The command in this case may be a command of a command set that forms a program, or a command designating an operation to a hardware circuit in the processor.

The storage unit 120 stores various kinds of information such as data and a program. The control unit 110, the first interface 130, and the second interface 140 operate, for example, using the storage unit 120 as a work area. The storage unit 120 may be a semiconductor memory such as an SRAM or a DRAM, a register, a magnetic storage device, or an optical storage device. The storage unit 120 stores the medium information of the printing device 200.

The first interface 130 is an interface communicating with the client 300 via the network NW. For example, the network NW in this case is a wireless LAN (local area network). The first interface 130 is, for example, a wireless communication device performing wireless communication conforming to the IEEE 802.11 standard. The first interface 130 is, for example, a Wi-Fi chip performing Wi-Fi-based wireless communication. However, the network NW in this case may be another network such as Ethernet, and the first interface 130 may be a communication interface for wired communication.

The server 100 in this embodiment performs communication based on a predetermined protocol with the client 300, using the first interface 130. Communication control for the communication based on this protocol is performed by the control unit 110. The control unit 110 in this case may be a processor provided separately from the first interface 130, a processor provided inside the first interface 130, or a combination of both.

The first interface 130 transmits medium information to the client 300 and receives a print request from the client 300, or the like, as described later.

The second interface 140 is a communication interface performing communication conforming to a USB standard, and communicates with the printing device 200. Specifically, the second interface 140 is a USB interface including a USB host controller, a routehub, and the like. As the USB standard, various standards such as USB 2.0 and USB 3.0 are known. The USB standard in this embodiment can include these various standards, and standards developed based on these standards.

The second interface 140 acquires medium information from the printing device 200 and transmits a print command and print data to the printing device 200, or the like, as described later.

Figure 3:
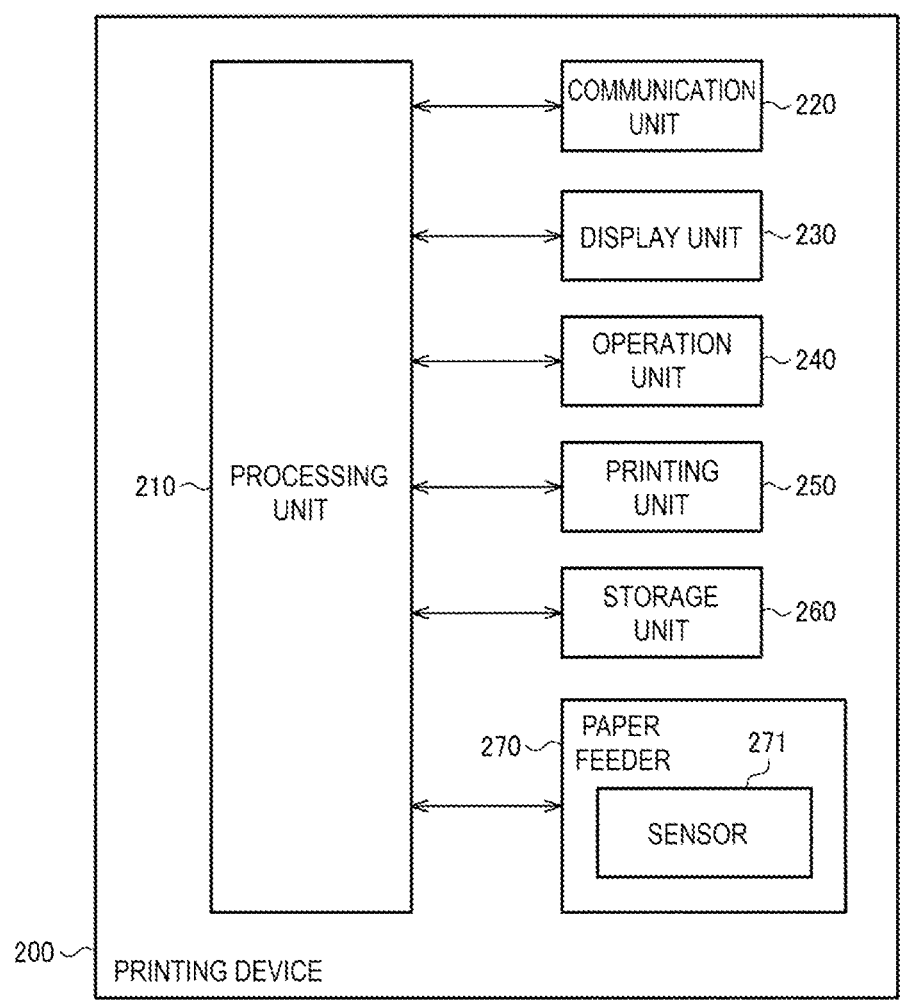
FIG. 3 shows an example of the configuration of a printing device.

FIG. 3 is a block diagram showing an example of the configuration of the printing device 200. The printing device 200 includes a processing unit 210, a communication unit 220, a display unit 230, an operation unit 240, a printing unit 250, a storage unit 260, and the paper feeder 270.

The processing unit 210 controls each part of the printing device 200. For example, the processing unit 210 can include a plurality of CPUs such as a main CPU and a sub CPU. The main CPU controls each part of the printing device 200 and performs overall control of the printing device 200. The sub CPU is, for example, a CPU performing various kinds of processing for printing.

The processing unit 210 in this embodiment is formed of hardware including at least one of a circuit processing a digital signal and a circuit processing an analog signal. For example, the hardware can be formed of one or a plurality of circuit devices or one or a plurality of circuit elements installed at a circuit board. The processing unit 210 may be implemented by a processor including hardware. The printing device 200 in this embodiment includes a memory storing information and a processor operating based on the information stored in the memory. As the processor, various processors such as a CPU, a GPU, and a DSP can be used. The memory may be a semiconductor memory, a register, a magnetic storage device, an optical storage device or the like.

The communication unit 220 performs communication conforming to a USB standard. Specifically, the communication unit 220 is a USB interface including a USB host controller or the like.

The communication unit 220 may include a wireless communication device executing wireless communication conforming to a Wi-Fi standard. However, it is conceivable that the communication unit 220 of the printing device 200 does not support the predetermined protocol used for the communication executed by the server 100 using the first interface 130.

The display unit 230 is formed of a display or the like displaying various kinds of information to a user. The operation unit 240 is formed of a button or the like accepting an input operation from the user. The display unit 230 and the operation unit 240 may be integrated together, for example, in the form of a touch panel.

The printing unit 250 includes a print engine. The print engine is a mechanical configuration executing printing of an image onto a print target medium. The print engine includes, for example, an inkjet ejection head, a drive mechanism for a carriage including the ejection head, and the like. The print engine ejects an ink from the ejection head onto a medium conveyed from the paper feeder 270 and thus prints an image on the medium. The print engine is not limited to the specific configuration described in this example and may print with a toner by an electrophotographic method.

The storage unit 260 stores various kinds of information such as data and a program. The processing unit 210 and the communication unit 220 operate, for example, using the storage unit 260 as a work area. The storage unit 260 may be a semiconductor memory, a register, a magnetic storage device, or an optical storage device. The storage unit 260 stores medium information.

The paper feeder 270 is a device in which a medium used for printing is placed. The paper feeder 270 is, for example, a paper cassette. The paper feeder 270 is provided with the sensor 271. The sensor 271 is, for example, a sensor detecting that a medium is set in the paper feeder 270. Alternatively, the sensor 271 may be a sensor configured to detect the size of the medium. For example, the sensor 271 detects the position of a paper guide for guiding the placement and conveyance of the medium and thus detects the size of the medium.

Figure 4:
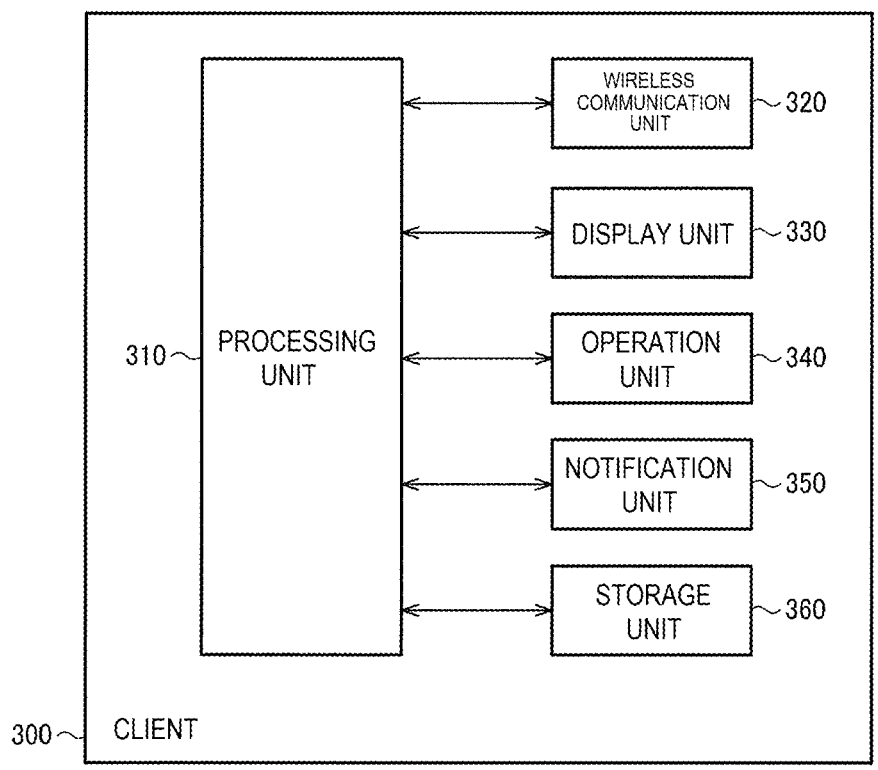
FIG. 4 shows an example of the configuration of a client.

FIG. 4 is a block diagram showing an example of the configuration of the client 300. The client 300 includes a processing unit 310, a wireless communication unit 320, a display unit 330, an operation unit 340, a notification unit 350, and a storage unit 360.

The processing unit 310 controls each of the wireless communication unit 320, the display unit 330, the operation unit 340, the notification unit 350, and the storage unit 360. Specifically, the processing unit 310 is a processor or a controller. The client 300 includes a memory storing information and a processor operating based on the information stored in the memory. For example, the memory stores application software and driver software. The processor operates according to the software and thus implements the application App and the driver Dri shown in FIG. 1.

The wireless communication unit 320 is implemented by at least one wireless communication device. The wireless communication device is, for example, a wireless communication device executing wireless communication conforming to a Wi-Fi standard. However, the client 300 may include a communication unit executing wired communication.

The display unit 330 is formed of a display or the like displaying various kinds of information to the user. The operation unit 340 is formed of a button or the like accepting an input operation from the user. The display unit 330 and the operation unit 340 may be integrated together, for example, in the form of a touch panel. The notification unit 350 gives a notification to the user. The notification unit 350 may be, for example, a speaker giving a notification by sound, a vibrating unit giving a notification by vibration, or a combination of these.

The storage unit 360 stores various kinds of information such as data and a program. The processing unit 310 and the wireless communication unit 320 operate, for example, using the storage unit 360 as a work area. The storage unit 360 may be a semiconductor memory such as an SRAM or a DRAM, a register, a magnetic storage device, or an optical storage device.

As shown in FIG. 2, the server 100 according to this embodiment includes the first interface 130, the second interface 140, the control unit 110, and the storage unit 120. The first interface 130 performs communication based on a predetermined protocol with the client 300. The second interface 140 performs communication based on a USB standard with the printing device 200. The control unit 110 controls the first interface 130 and the second interface 140.

To implement communication via a network, a plurality of protocols are used. The plurality of protocols are, for example, various protocols included in the TCP/IP (Transmission Control Protocol/Internet Protocol) group. In this embodiment, too, it is assumed, for example, that communication via Ethernet or a wireless LAN is implemented using a MAC (medium access control) protocol or the like and that a plurality of protocols operating thereon are combined together to implement communication for providing the function of the printing device 200 to the client 300. The "predetermined protocol" may refer to a combination of the plurality of protocols or may refer to a part of these protocols. The "predetermined protocol" in this embodiment may be any protocol for which medium information is essential or useful. Various modifications can be made to the specific protocol that is employed.

The control unit 110 performs control to acquire medium information of a medium stored in the paper feeder 270 of the printing device 200, via the second interface 140, and store the acquired medium information in the storage unit 120. When receiving an acquisition request for the medium information from the client 300 via the first interface 130, the control unit 110 performs control to read out the medium information from the storage unit 120 and transmit the read-out medium information to the client 300 via the first interface 130.

The technique according to this embodiment enables the server 100 communicating with the client 300 using a predetermined protocol to collect medium information of the USB-coupled printing device 200 and to provide the collected medium information to the client 300. Thus, even when the printing device 200 itself does not support the predetermined protocol, the function of the printing device 200 can be provided to the client 300, using this protocol. In this case, not only a simple print function but also a function using the medium information can be provided. For example, in the printing using the server 100, at least one of a paper size and a paper type that are set as default print setting values can be displayed when the user carries out a print operation. This can make the user's operation easier and can restrain a print error due to a setting error.

The technique according to this embodiment can be applied to the printing system 10 including the printing device 200 and the server 100. The server 100 in the printing system 10 includes the first interface 130, the second interface 140, the control unit 110, and the storage unit 120, as described above. The control unit 110 of the server 100 performs control to acquire medium information of a medium stored in the paper feeder 270 of the printing device 200, via the second interface 140, and store the acquired medium information in the storage unit 120. When receiving an acquisition request for the medium information from the client 300 via the first interface 130, the control unit 110 performs control to read out the medium information from the storage unit 120 and transmit the read-out medium information to the client 300 via the first interface 130.

2. Flow of Processing

Figure 5:
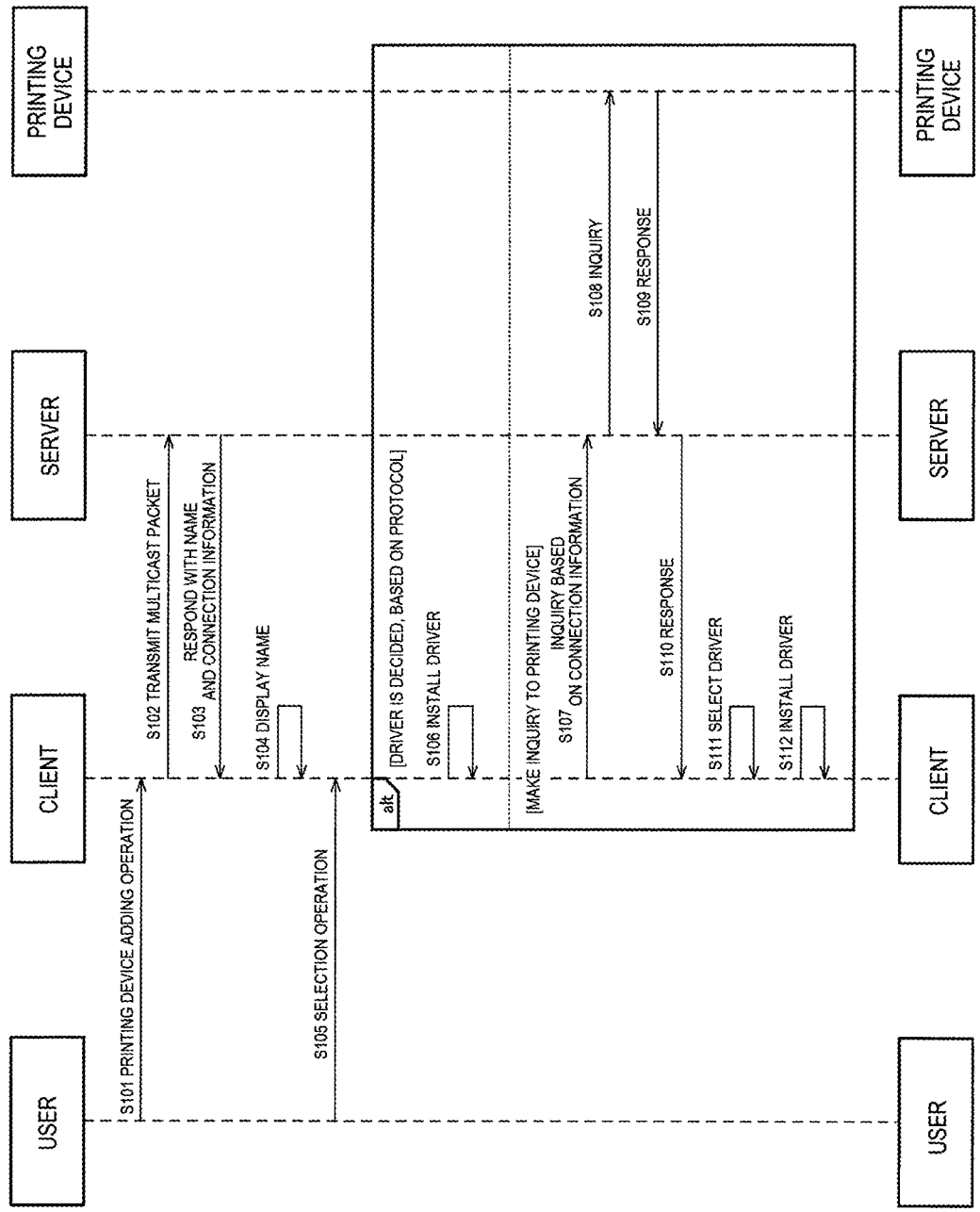
FIG. 5 explains processing performed when the client adds a printing device.

A flow of processing in this embodiment will now be described in detail.
2.1 Processing before Printing at Client
FIG. 5 explains a flow of processing executed before printing at the client 300. Specifically, the client 300 searches for the printing device 200 and installs the driver Dri. Although details of the communication form may be omitted in the description of FIG. 5, the communication between the client 300 and the server 100 is performed via the network NW. Specifically, the server 100 communicates with the client 300, using the first interface 130. The communication between the server 100 and the printing device 200 is performed using a USB. Specifically, the server 100 communicates with the printing device 200, using the second interface 140. This feature similarly applies to the description of the drawings from FIG. 6 onward.

When this processing is started, first in step S101, the user carries out an operation of adding the printing device 200 to the client 300. In step S102, the client 300 performs processing of searching for the printing device 200 on the network NW. Specifically, the client 300 transmits a multicast packet to the network NW. The server 100 is coupled to the same network NW as the client 300 and therefore can receive the multicast packet.

In step S103, the server 100 transmits the name and connection information of the printing device 200 as a response to the multicast packet. Specifically, the server 100 acquires information about the USB-coupled printing device 200 in advance. A plurality of printing devices 200 may be USB-coupled to the server 100. In this case, the server 100 transmits the name and connection information of each of the plurality of printing devices 200. In step S103, the server 100 may also transmit the name and connection information of the server 100 itself.

The connection information in this example is information used for the client 300 to specify the printing device 200 and transmit a command and print data to the specified printing device 200. For example, the connection information includes an IP address and a port number. The client 300 may specify the printing device 200, using a URL (Uniform Resource Locator). The connection information in this case may be the URL.

In step S104, the client 300 displays the name of the server 100 or the printing device 200 on the display unit 330. Also, another server 100 or printing device 200 may be coupled to the network NW. In such a case, in step S104, the names of a plurality of servers 100 or a plurality of printing devices 200 are displayed.

In step S105, the user selects the name of the printing device 200 to be used for printing, from among the one or plurality of names displayed on the display unit 330. The client 300 performs processing of installing the driver Dri for using the selected printing device 200.

Depending on the protocol used for communication, only one driver Dri may be available. In this case, in step S106, the client 300 performs processing of installing this driver Dri. In some systems, a function equivalent to the driver Dri is incorporated in advance and therefore the driver Dri need not be installed. In this case, the processing of step S106 can be omitted and the client 300 simply stores the information about the printing device 200 selected in step S105.

Meanwhile, when the driver Dri is not univocally decided based on the protocol, the client 300 makes an inquiry to the printing device 200 and decides the driver Dri, based on the response. Specifically, in step S107, the client 300 inquires about the machine type and the print data format to be supported, based on the connection information of the printing device 200 selected by the user. The inquiry from the client 300 is transmitted to the server 100.

In step S108, the server 100 makes an inquiry about the machine type or the like to the printing device 200, based on the inquiry from the client 300. In step S109, the printing device 200 responds with information about the machine type or the like, to the server 100. The server 100 may acquire and store in advance the information about machine type or the like of the printing device 200 when the printing device 200 is USB-coupled to the server 100. In this case, the processing of steps S108 and S109 can be omitted. In step S110, the server 100 responds with the information about the machine type or the like of the printing device 200, to the client 300.

In step S111, the client 300 selects the driver Dri, based on the machine type and the print data format responsed. In step S112, the client 300 installs the selected driver Dri. The client 300 may perform processing of downloading the driver Dri, using a network such as the internet, according to need.

As described above, when receiving a search request for the printing device 200 from the client 300, the control unit 110 of the server 100 performs control to transmit printing device information about the USB-coupled printing device 200 to the client 300 via the first interface 130.

The search request is, for example, the multicast packet in step S102. However, the search request may be any request for a response from the printing device 200 or the server 100 present on the network NW, and its specific format is not limited to this example. The printing device information is information about the printing device 200 and includes, for example, the name and the connection information, as described above.

Thus, the server 100 can properly transmit information about the USB-coupled printing device 200 to the client 300. Although the printing device 200 in this case is not directly coupled to the network NW, the server 100 coupled to the network NW responds instead of the printing device 200 and thus enables the client 300 to search for the printing device 200. In other words, the server 100 in this embodiment behaves as if it is the printing device 200 when viewed from the client 300.

2.2 Medium Information Setting in Printing Device

Figure 6:
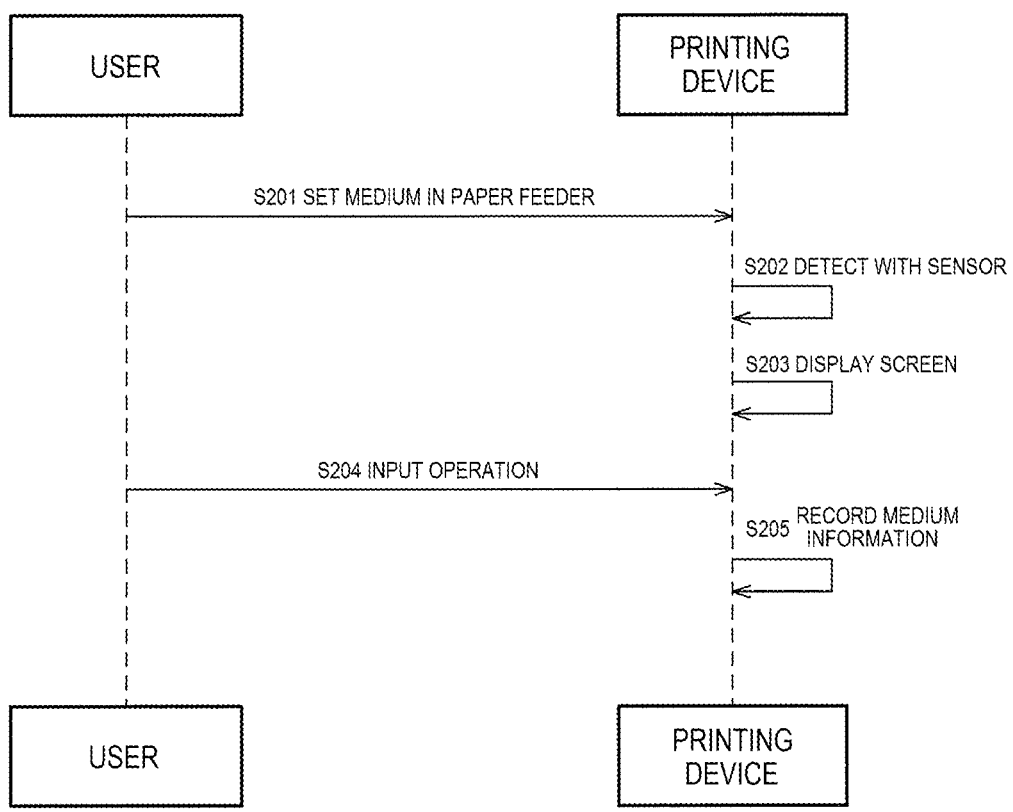
FIG. 6 explains medium information acquisition processing by the printing device.

FIG. 6 explains processing in which the printing device 200 acquires medium information. First, in step S201, the user sets a medium in the paper feeder 270 of the printing device 200. The medium in this case is, for example, a paper. The user places the paper at a predetermined position along a paper guide.

In step S202, the printing device 200 detects that a medium is set in the paper feeder 270, using the sensor 271. When it is detected that a medium is set, the printing device 200 in step S203 displays a screen inquiring about medium information on the display unit 230.

Figure 7:
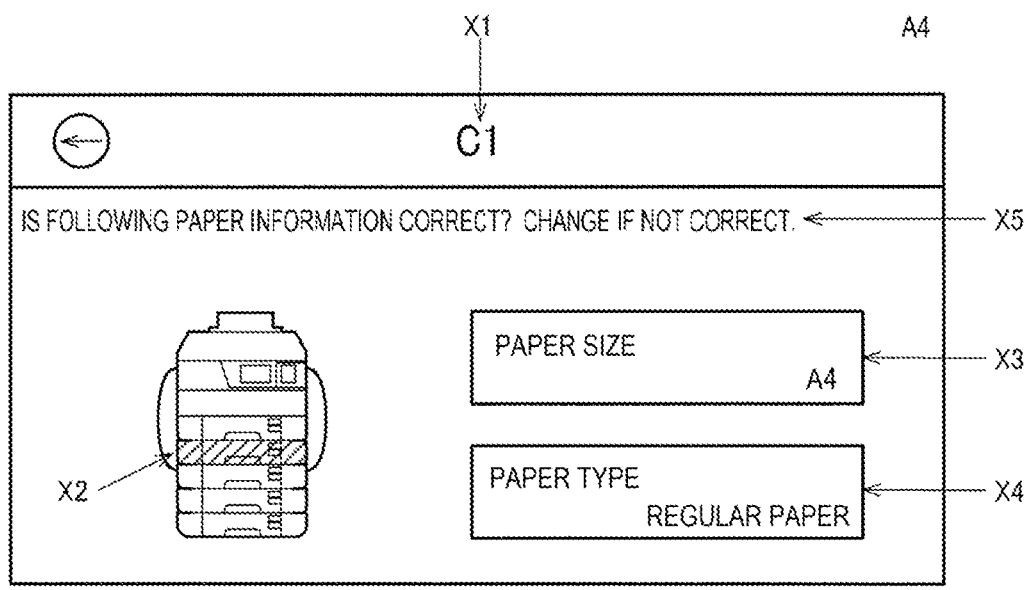
FIG. 7 shows an example of a screen displayed on a display unit of the printing device.

FIG. 7 shows an example of the screen displayed in step S203. As shown in FIG. 7, the printing device 200 displays a display screen including information specifying the paper feeder 270, size information, and type information. The information specifying the paper feeder 270 may be the name of the paper feeder 270 as indicated by X1 or information specifying the position of the paper feeder 270 in an external view of the printing device 200 as indicated by X2. FIG. 7 shows an example where the printing device 200 specifies the paper feeder 270 in which a medium is set, as C1, based on an output from the sensor 271.

Tentative size information indicated by X3 and tentative type information indicated by X4 are displayed on the display screen. Also, a text prompting the user to check and change the medium information is displayed on the display screen, for example, as indicated by X5. The user checks the display screen and carries out an operation to input medium information, using the operation unit 240, according to need. The size information and the type information may be hidden in the initial state and may be displayed after the user makes an input. Alternatively, size information and type information that are set as default may be displayed in the initial state. The default size information and type information may be arbitrarily set but may be, for example, "A4" and "regular paper", which are frequently used.

The sensor 271 in this embodiment may be a sensor that can detect the paper size. For example, the sensor 271 detects the position of the paper guide and thus detects the paper size. In this case, the result of the detection by the sensor 271 is displayed as the size information in the initial state.

Referring back to FIG. 6, the description continues. In step S204, the user inputs size information and type information based on the display screen shown in FIG. 7 and presses an enter button. In step S205, the printing device 200 stores the inputted medium information as set values in the storage unit 260.

The printing device 200 may include a plurality of paper feeders 270. In this case, different media can be set from one paper feeder 270 to another. Therefore, the printing device 200 stores the medium information of each paper feeder 270 in the storage unit 260. Also, the control unit 110 of the server 100 performs control to acquire the medium information about the medium stored in each paper feeder 270 of the plurality of paper feeders 270, via the second interface 140, as described later.

Figures 8, 9:
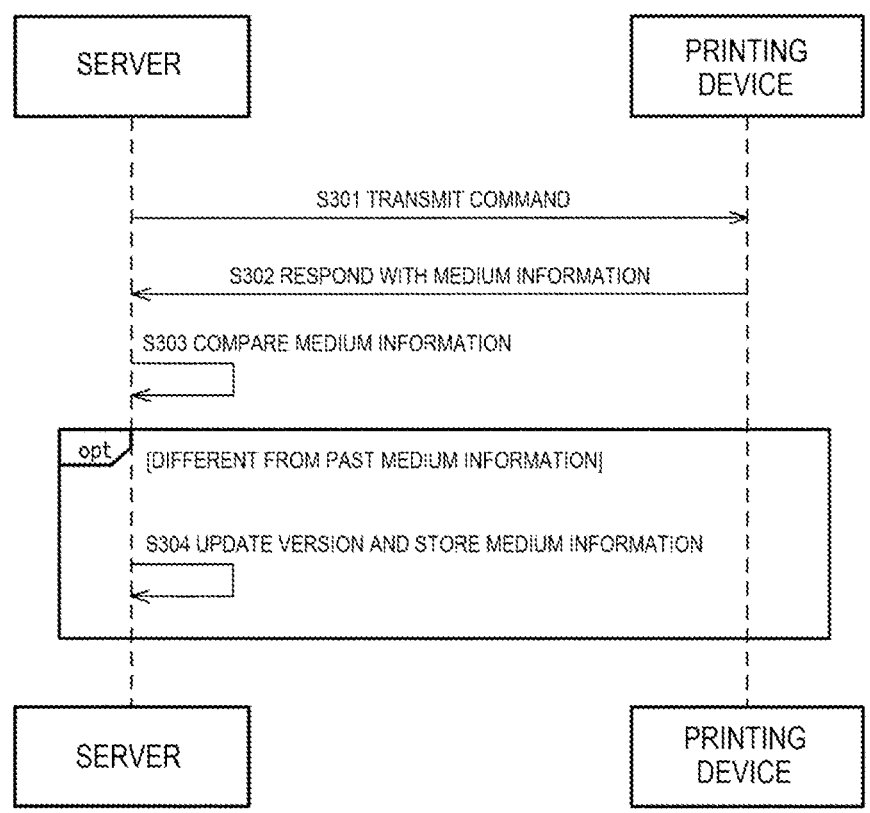
FIG. 8 shows an example of medium information.
FIG. 9 explains processing in which the server acquires medium information from the printing device.

FIG. 8 shows an example of the medium information stored in the storage unit 260 by the printing device 200. The medium information includes information specifying the paper feeder 270, size information, and type information. The information specifying the paper feeder 270 is, for example, the name of the paper feeder 270. The medium information may also include other information not shown in FIG. 8.

FIG. 8 shows an example of the medium information in the printing device 200 including four paper feeders 270 indicated by C1 to C4. In this example, an A4 regular paper is set in the paper feeder 270 indicated by C1. Similarly, an L-size photographic paper is set in the paper feeder 270 indicated by C2. An A4 regular paper is set in the paper feeder 270 indicated by C3. An A5 regular paper is set in the paper feeder 270 indicated by C4.

In this way, the medium information in one printing device 200 may be information specifying a medium set in each paper feeder 270 of a plurality of paper feeders 270. This enables proper management of information about the media set in the printing device 200 including the plurality of paper feeders 270. As described above with reference to FIGS. 6 and 7, when it is detected that a medium is set in a predetermined paper feeder 270, the medium information of this paper feeder 270 is updated.

The printing device 200 may include a single paper feeder 270. In this case, the medium information is information about a medium set in this single paper feeder 270.

2.3 Transmission of Medium Information from Printing Device to Server

FIG. 9 explains processing in which the printing device 200 transmits medium information stored therein, to the server 100. First, in step S301, the server 100 transmits a command to acquire medium information to the printing device 200, using a USB. The processing of step S301 is, for example, periodically executed. The interval of execution of the processing is, for example, several seconds. However, the interval is not limited to any specific time period. When a plurality of printing devices 200 are USB-coupled to the server 100, the processing shown in FIG. 9 is executed with respect to each of the printing devices 200.

On receiving the command, the printing device 200 in step S302 reads out medium information stored in the storage unit 260 and transmits this medium information to the server 100, using the USB.

In step S303, the server 100 compares the past medium information of the target printing device 200 with the medium information newly acquired in step S302. When these pieces of medium information are the same, the server 100 ends the processing. Specifically, it is determined that the medium in the printing device 200 is not changed and that the medium information stored in the storage unit 120 can still be used. That the pieces of medium information are the same means, for example, that all of the size information and the type information corresponding to each paper feeder 270 shown in FIG. 8 are the same between the past medium information and the newly acquired medium information.

When at least one of the size information and the type information is changed in at least one paper feeder 270, it is determined that the two pieces of medium information are different from each other. In this case, in step S304, the server 100 stores the medium information acquired in step S302, in the storage unit 120. In step S304, the server 100 also updates version information of the medium information. The version information in this case is information representing the version of the medium information. The version information may be numerical data with its value incremented every time the medium information is updated, or may be a timestamp indicating an update timing. The version information may also be information that changes according to the content of the medium information.

Figures 10, 11:
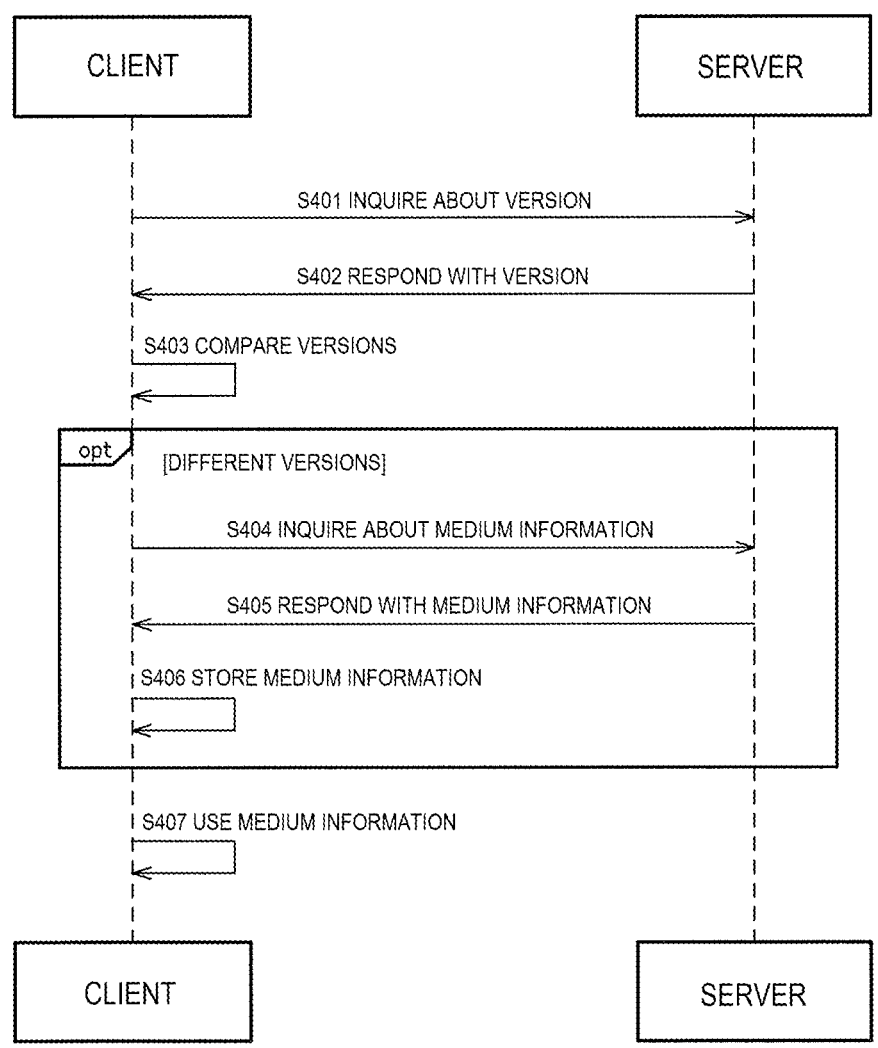
FIG. 10 shows an example of information stored by the server.
FIG. 11 explains processing in which the client acquires medium information from the server.

FIG. 10 shows an example of the information stored in the storage unit 120 by the server 100. One or a plurality of printing devices 200 are USB-coupled to the server 100. In this case, for each printing device 200, information specifying the printing device 200, connection information, medium information, and version information are stored.

The information specifying the printing device 200 may be a name or identification information such as a MAC address. The connection information is an IP address, a port number, a URL or the like, as described above. The medium information is size information and type information corresponding to each paper feeder 270, as described above with reference to FIG. 8. The version information is information for managing the version of one piece of medium information, as described above. Here, since one piece of medium information corresponds to one printing device 200, the version information, too, is managed for each printing device 200. However, a modification such as providing version information corresponding to each paper feeder 270 is not precluded.

As described above, when acquiring medium information via the second interface 140, the control unit 110 manages the version information of the medium information, based on the comparison between the acquired medium information and the past medium information stored in the storage unit 120. The comparison targets in this case are two pieces of medium information acquired at different timings from the same printing device 200. This enables determination about whether the medium information is updated or not, using the version information. For example, the server 100 transmits the version information to the client 300 and causes the client 300 to determine whether the medium information is updated or not, as described later with reference to FIG. 11. This enables omission of unnecessary transmission of the medium information, reduction in communication load, and the like.

As described later with reference to FIG. 11, the medium information is information used at the client 300. The client 300 makes an inquiry to the server 100 when the client 300 needs the medium information. Therefore, the execution of the processing shown in FIG. 9 by the server 100 triggered by an inquiry from the client 300 is not precluded. However, depending on the USB communication state, at a certain timing, the server 100 cannot issue a command for acquiring the medium information. For example, the server 100 cannot issue the command while transmitting print data to the printing device 200 from which the medium information is to be acquired.

Therefore, the server 100 may periodically execute the command transmission shown in step S301 in FIG. 9, as described above. Thus, the medium information held by the server 100 is updated every several seconds. When receiving an inquiry from the client 300, the server 100 may respond with the medium information held by the server 100 itself, instead of issuing the command to the printing device 200. This can restrain a delay in the response.

2.4 Transmission of Medium Information from Server to Client

Figure 12:
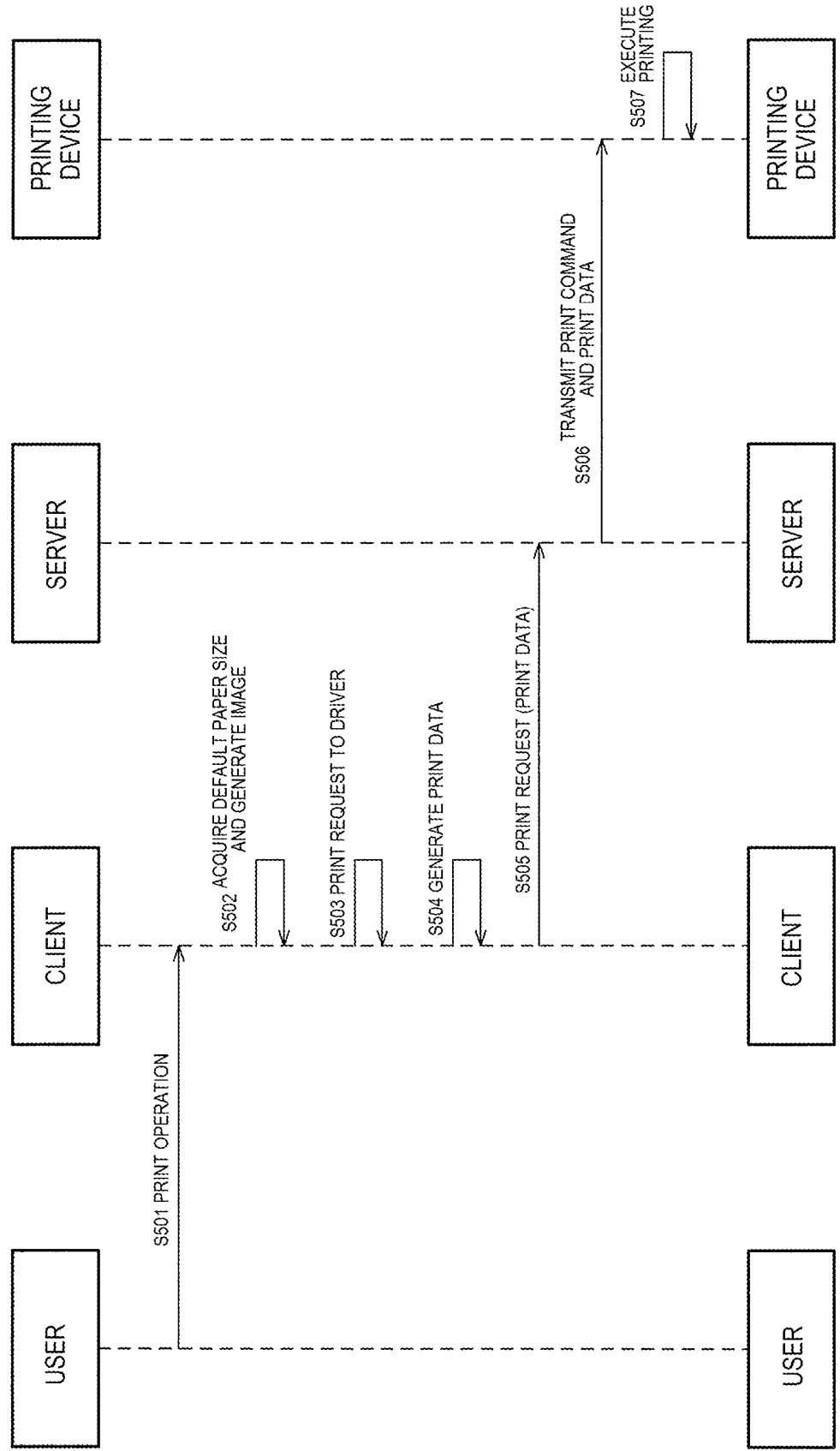
FIG. 12 explains printing processing.
Figure 13:
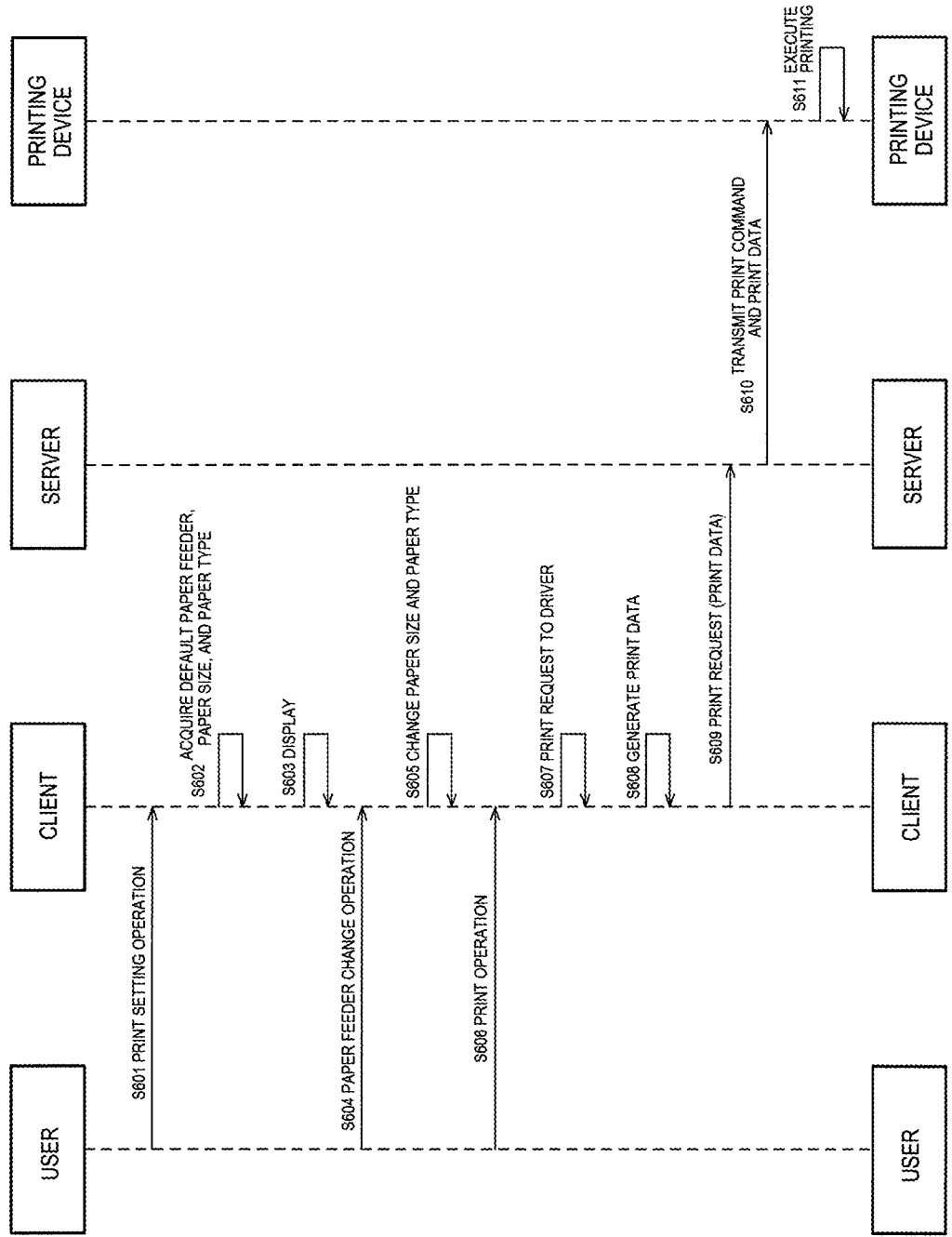
FIG. 13 explains printing processing.

FIG. 11 explains processing in which medium information is transmitted from the server 100 to the client 300. First, in step S401, the client 300 transmits an inquiry to the server 100 when the client 300 needs the medium information of a predetermined printing device 200. The processing of step S401 is performed, for example, by the driver Dri. The medium information is needed when a print operation shown in FIG. 12 is carried out or when a print setting operation shown in FIG. 13 is carried out, as described later. Specifically, the inquiry in step S401 is an inquiry about the version information.

In step S402, the server 100 responds with the version information corresponding to the target printing device 200. In step S403, the client 300 compares the acquired version information with the version information acquired and stored based on the previous inquiry about the target printing device 200. The processing of step S403 is performed, for example, by the driver Dri.

When these versions are the same, the client 300 skips the processing of steps S404 to S406. In step S407, the client 300 continues to use the medium information of the printing device 200 that is acquired in the past.

When the versions are different from each other, the client 300 in step S404 makes an inquiry about the medium information of the printing device 200 to the server 100. The processing of step S404 is performed, for example, by the driver Dri. In step S405, the server 100 transmits the medium information of the printing device 200 about which the inquiry is made, to the client 300. In step S406, the client 300 stores the acquired medium information in the storage unit 360. In this case, in step S407, the client 300 uses the newly acquired medium information.

As described above, the control unit 110 of the server 100 transmits the version information to the client 300 via the first interface 130 (step S402). When receiving an acquisition request for the medium information from the client 300, based on the version information (step S404), the control unit 110 transmits the medium information (step S405).

Thus, the transmission and reception of the medium information between the server 100 and the client 300 can be controlled using the version information. The version information is, for example, numerical data with its value changing every time the medium information is updated. Therefore, the version information has a smaller data volume than the medium information. Also, the comparison between two pieces of version information has a lower processing load than the comparison between two pieces of medium information. Therefore, as the version information is first transmitted and received, as shown in FIG. 11, the client 300 can determine whether the medium information is updated or not, easily and with a small communication data volume. Consequently, unnecessary communication can be restrained when the medium information is not updated.

2.5 Printing

FIG. 12 explains a flow of processing for printing. First, in step S501, the user operates the application App on the client 300 and carries out a print operation. The print operation is, for example, a press on a print button displayed by the application App. Based on the operation in step S501, the client 300 determines that the medium information of the printing device 200 is needed. Therefore, the processing shown in FIG. 11 is executed, triggered by step S501. The client 300 acquires size information and type information corresponding to each paper feeder 270. The processing from step S502 onward corresponds to step S407 in FIG. 11.

In step S502, the application App on the client 300 acquires a default paper feeder 270 and size information corresponding to this paper feeder 270, from the driver Dri. In step S502, the application App also generates an image for printing according to the size information.

In step S503, the application App calls the API of the driver Dri and thus requests printing. The print request in step S503 is provided with the image generated in step S502.

In step S504, the driver Dri generates print data, based on the default paper feeder 270 and the size information and the type information corresponding to this paper feeder 270. The print data in this case includes, for example, data specifying a print image. In step S505, the driver Dri transmits the print data to the server 100 via the network NW and thus requests printing.

In step S506, the server 100 transmits a print command and the print data to the printing device 200, using the USB. In step S507, the printing device 200 executes printing, using the printing unit 250.

In the processing shown in FIG. 12, once the user carries out the print operation, the user no longer needs to carry out an operation to select the paper feeder 270 or the like. Therefore, the user burden involved in printing can be reduced.

FIG. 13 explains another flow of processing for printing. First, in step S601, the user operates the application App on the client 300 and a print setting operation. The print setting operation is an operation for setting the size and the type of a medium before printing. The setting before printing may include a color/monochrome setting, a single-sided/double-sided print setting, and the like. Based on the operation in step S601, the client 300 determines that the medium information of the printing device 200 is needed. Therefore, the processing shown in FIG. 11 is executed, triggered by step S601. The client 300 acquires size information and type information corresponding to each paper feeder 270. The processing from step S602 onward corresponds to step S407 in FIG. 11.

In step S602, the application App on the client 300 acquires a default paper feeder 270 and size information and type information corresponding to this paper feeder 270, from the driver Dri. In step S603, the application App displays the acquired size information and type information as an option on the display unit 330.

Figure 14:
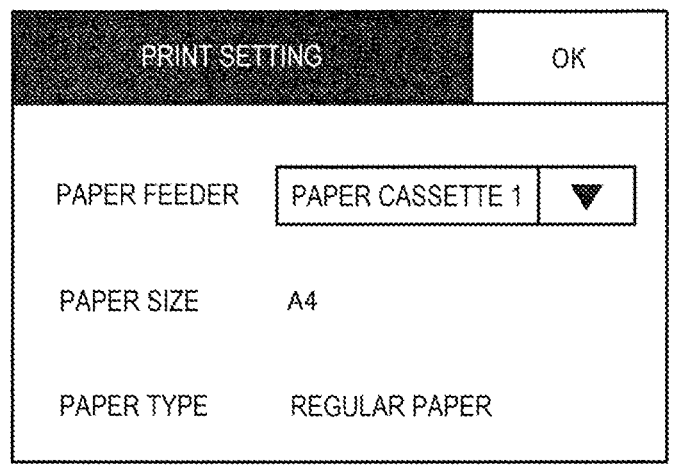
FIG. 14 shows an example of a print setting screen.

FIG. 14 shows an example of a print setting screen displayed in step S603. The print setting screen is a screen displaying a selected paper feeder 270 and size information and type information corresponding to this paper feeder 270. The selected paper feeder 270 can be changed, for example, using a pull-down menu.

Figure 15:
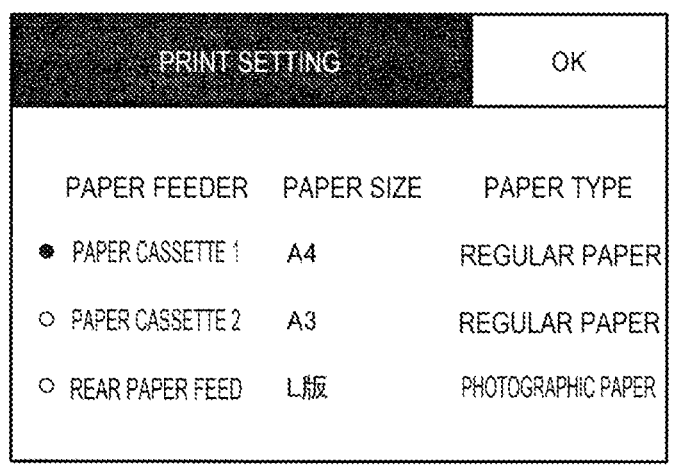
FIG. 15 shows another example of the print setting screen.

FIG. 15 shows another example of the print setting screen displayed in step S603. The print setting screen is a screen displaying a list of one or a plurality of paper feeders 270 provided in the printing device 200 and size information and type information corresponding to each paper feeder 270. In the example shown in FIG. 15, an operation to select one of the paper feeders 270 can be made, for example, using a radio button or the like.

In step S604, the user carries out an operation to change the paper feeder 270. The operation in step S604 may be an operation using the pull-down menu shown in FIG. 14, a selection operation using the radio button shown in FIG. 15, or other operations. The application App on the client 300 updates the display screen in response to the selection operation. In the case of FIG. 14, the application App changes the displayed size information and type information according to the selected paper feeder 270. In the case of FIG. 15, the application App changes the selection state of the radio button. In step S605, the application App updates the current size and type settings, using the size information and the type information corresponding to the paper feeder 270 in the selected state. The processing of steps S604 and S605 may be performed a plurality of times or may be not performed even once.

As the user carries out a print operation in step S606, the application App calls the API of the driver Dri and thus requests printing. The operation in step S606 is, for example, a press on an OK button in FIG. 14 or FIG. 15.

In step S608, the driver Dri generates print data, based on the paper feeder 270 in the selected state and the size information and the type information corresponding to this paper feeder 270. In step S609, the driver Dri transmits the print data to the server 100 via the network NW and thus requests printing.

In step S610, the server 100 transmits a print command and the print data to the printing device 200, using the USB. In step S611, the printing device 200 executes printing, using the printing unit 250.

Thus, when the function of the printing device 200 is provided to the client 300 using the server 100, the medium information can be used in printing. Therefore, the operation burden on the user can be reduced. For example, as shown in FIG. 12, operations other than the print operation can be omitted. In the example shown in FIG. 13, the selection operation by the user can be simplified when the default size and type can be used. The size information and the type information in this case are the medium information acquired from the printing device 200 via the server 100. Therefore, a size or type setting error can be restrained.

As shown in step S506 or step S610, the server 100 transmits the print data to the printing device 200, using the second interface 140. Also, as shown in steps S301 and S302 in FIG. 9, the server 100 periodically transmits a command to and receives medium information from the printing device 200, using the second interface 140. Although it depends on the communication form using the second interface 140, the transmission of print data to and the reception of medium information from the same printing device 200 cannot be simultaneously carried out, for example, in the case of the USB. Therefore, when print data has a large data volume, continuous transmission of the print data may obstruct periodical acquisition of medium information by the server 100.

Therefore, when receiving print data from the client 300 via the first interface 130, the control unit 110 of the server 100 may control the second interface 140 to execute the acquisition of medium information preferentially over the transmission of print data. This can restrain the transmission of print data from obstructing the acquisition of medium information. That is, the server 100 can periodically acquire medium information and therefore can provide proper medium information to the client 300.

For example, even when receiving print data from the client 300 via the first interface 130, the control unit 110 does not transmit print data to the printing device 200 during a period from when a medium information acquisition command is transmitted to the printing device 200 to when medium information is acquired.

Figure 16:
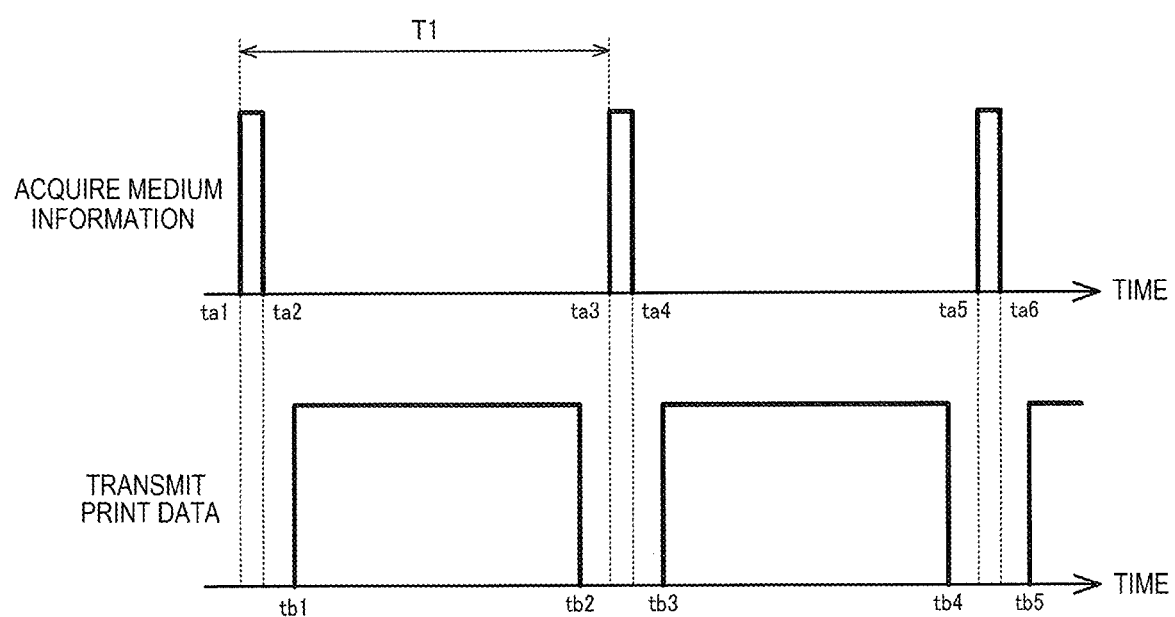
FIG. 16 explains a timing of executing medium information acquisition processing and print data transmission processing.

FIG. 16 explains the relationship between the timing of acquiring medium information and the timing of transmitting print data. The horizontal axis in FIG. 16 represents time. As described above, the transmission of a command and the acquisition of medium information are periodically executed. In the example shown in FIG. 16, the server 100 transmits a command at a timing ta1 and completes the acquisition of medium information at a timing ta2. Similarly, ta3, ta5 represent the timing of transmitting a command and ta4, ta6 represent the timing of completing the acquisition of medium information. T1, which is the interval between ta1 and ta3 and the interval between ta3 and ta5, is set to approximately several seconds. The interval between ta1 and ta2 is sufficiently shorter than T1.

The server 100 does not transmit print data, for example, during periods ta1-ta2, ta3-ta4, and ta5-ta6. For example, the server 100 transmits print data during a period tb1-tb2 and a period tb3-tb4, as shown in FIG. 16. The timing tb1 is later than ta2. The timing tb2 is earlier than ta3. The timing tb3 is later than ta4. The timing tb4 is earlier than ta5.

Thus, the transmission of print data can be restrained from obstructing the command transmission and the acquisition of medium information. Particularly, when the timing of transmitting a command is periodically set in advance, the period from when a command is transmitted to when medium information is acquired is known to some extent, as shown in FIG. 16. This makes it easy to implement control not to transmit print data during this period.

In this case, print data according to one print job acquired from a predetermined client 300 may be divided into first to n-th print data. Here, n is an integer equal to or greater than 2. The print job in this case is information for causing the printing device 200 to execute one print operation, and includes a print command instructing the printing device 200 to execute printing, and print data specifying an image. After transmitting i-th print data, the control unit 110 of the server 100 transmits a medium information acquisition command to and receives medium information from the printing device 200. After receiving the medium information, control unit 110 transmits (i+1)th print data. Here, i is an integer satisfying 1≤i<n.

For example, in FIG. 16, the control unit 110 transmits the i-th print data during the period tb1-tb2 and transmits the (i+1)th print data during the period tb3-tb4. Dividing and transmitting print data of one print job in multiple times in this way enables proper acquisition of medium information even when a print request for print data having a rather large data volume is accepted.

In this case, the first to n-th print data are adjusted to a data volume that can be transmitted in a shorter period than the interval of transmission of the acquisition command. The interval of transmission of the acquisition command is, for example, T1 in FIG. 16. More specifically, the first to n-th print data are adjusted to a data volume that can be transmitted in a shorter period than the period from the acquisition of medium information to the transmission of the next acquisition command. Thus, the transmission of one print data of the n-divided print data can be expected to be completed by the next command transmission. This can further restrain the transmission of print data from obstructing the acquisition of medium information.

The processing of dividing print data according to one print job into first to n-th print data is executed, for example, by the control unit 110 of the server 100. However, this processing may be executed by the client 300.

3. Modification Examples

In the above description, an example where the client 300 makes an inquiry about medium information to the server 100 when the client 300 needs medium information is explained, as described in FIGS. 11 to 13. However, the control to transmit medium information from the server 100 to the client 300 is not limited to this example.

Figure 17:
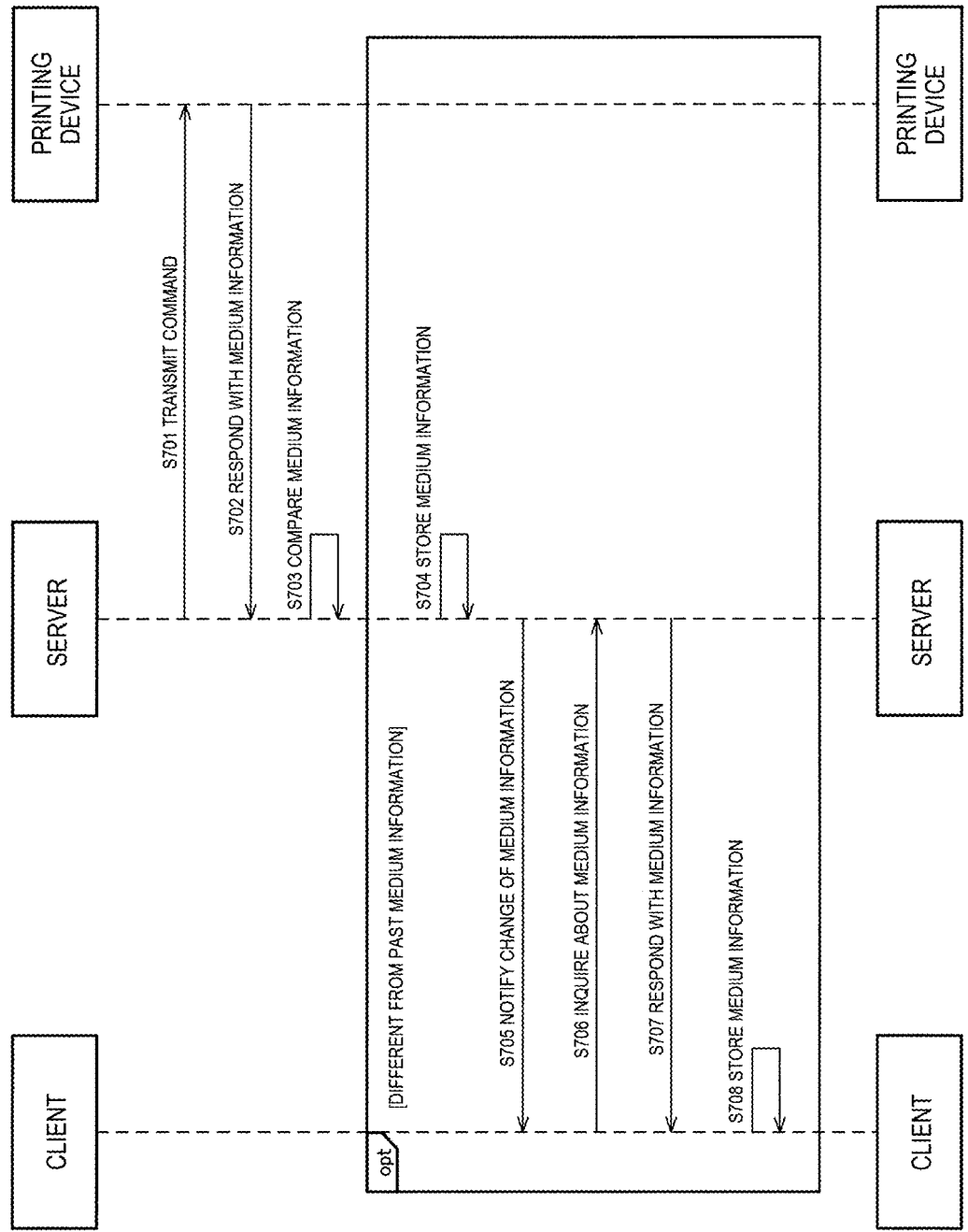
FIG. 17 explains processing performed when the server notifies a change of medium information.

FIG. 17 explains processing in a modification example. Steps S701 to S704 are similar to steps S301 to S304 in FIG. 9. Specifically, first, in step S701, the server 100 transmits a command to the printing device 200. On receiving the command, the printing device 200 in step S702 reads out medium information stored in the storage unit 260 and transmits this medium information to the server 100, using the USB.

In step S703, the server 100 compares the past medium information of the target printing device 200 with the medium information newly acquired in step S702. When these pieces of medium information are the same, the server 100 ends the processing. When the two pieces of medium information are different from each other, the server 100 in step S704 stores the medium information acquired in step S702, in the storage unit 120.

Next, in step S705, the server 100 notifies the client 300 of a change of the medium information. Specifically, the server 100 transmits a multicast packet to the network NW.

In step S706, on receiving the multicast packet, the driver Dri of the client 300 makes an inquiry about the medium information to the server 100 via the network NW. In step S707, the server 100 responds with size information and type information corresponding to each paper feeder 270. In step S708, the driver Dri of the client 300 receives the response from the server 100 and stores the medium information in the storage unit 360.

Thus, when the medium information is updated, the server 100 can prompt the client 300 to make an inquiry. When the medium information is not updated, the client 300 need not to make an inquiry and therefore the communication load can be restrained. The notification in step S705 is carried out, for example, using a multicast packet. Therefore, even when the power of the client 300 is off, its influence on the operation of the server 100 can be restrained. For example, the server 100 need not wait for a timeout when there is no response from the client 300.

However, even when the medium information held by the server 100 is updated, the client 300 with its power off cannot detect the update. Therefore, there is a discrepancy between the medium information held by the server 100 and the medium information held by the client 300. To cope with this, the client 300 may make an inquiry at the startup.

Figure 18:
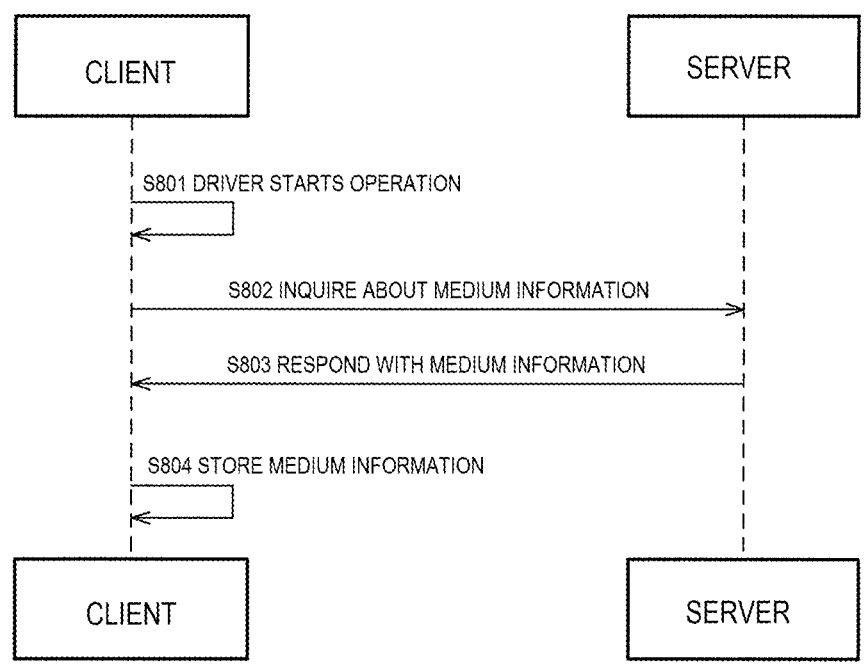
FIG. 18 explains processing performed at the startup of the client.

FIG. 18 explains processing at the startup of the driver Dri. First, in step S801, the driver Dri of the client 300 starts operation. In step S802, when starting operation, the driver Dri makes an inquiry about medium information to the server 100 via the network NW.

In step S803, the server 100 sends back medium information as a response to the inquiry. The driver Dri of the client 300 receives the response and stores size information and type information corresponding to each paper feeder 270. Thus, the discrepancy between the medium information held by the server 100 and the medium information held by the client 300 can be resolved at the start of operation.

In the above description, an example where size information and type information are used as medium information is explained. However, the medium information may include information about whether a medium is set in a predetermined paper feeder 270 or not. In this case, when determining that a medium is not set in the paper feeder 270 set by default, for example, in step S502 in FIG. 12, the client 300 performs processing of changing the selected paper feeder 270 to another paper feeder 270. Alternatively, in the display processing of step S603 in FIG. 13, the client 300 may perform processing of eliminating the paper feeder 270 in which a medium is not set, from the options.

In the above description, the printing device 200 first acquires medium information, as shown in FIG. 6, and then the server 100 acquires the medium information from the printing device 200, using the second interface 140, as shown in FIG. 9. However, it is conceivable that the printing device 200 is a device that does not support a predetermined protocol using medium information.

Therefore, the printing device 200 may not have a function of acquiring medium information. Therefore, the server 100 may execute control on the printing device 200 for the user to input medium information. For example, the server 100 performs control to generate the display screen shown in FIG. 7 and to cause the display unit 230 of the printing device 200 to display this display screen. This enables the printing device 200 to acquire medium information, with the server 100 serving as the start point.

Alternatively, the server 100 may include the first interface 130, the second interface 140, the control unit 110, the storage unit 120, and a display unit and an operation unit, not illustrated. For example, the control unit 110 displays a display screen similar to the display screen shown in FIG. 7, on the display unit of the server 100, and the operation unit accepts a user input based on the display screen. The control unit 110 performs control to acquire medium information of a medium stored in the paper feeder 270 of the printing device 200, using the operation unit, and store the acquired medium information in the storage unit 120.

This enables the server 100 to directly acquire the medium information of the printing device 200. The control from then on is similar to the above. When receiving an acquisition request for medium information from the client 300 via the first interface 130, the control unit 110 performs control to readout medium information from the storage unit 120 and transmit the read-out medium information to the client 300 via the first interface 130.

As described above, the server according to this embodiment includes: a first interface performing communication based on a predetermined protocol with a client; a second interface performing communication based on a USB (Universal Serial Bus) standard with a printing device; a control unit controlling the first interface and the second interface; and a storage unit. The control unit performs control to acquire medium information of a medium stored in a paper feeder of the printing device, via the second interface, and store the acquired medium information in the storage unit. When receiving an acquisition request for the medium information from the client via the first interface, the control unit performs control to read out the medium information from the storage unit and transmit the read-out medium information to the client via the first interface.

The technique according to this embodiment enables the server providing the function of the printing device to the client using a predetermined protocol to transmit the medium information of the printing device to the client. Thus, user burden can be reduced and print errors can be restrained. Also, even when the predetermined protocol is a protocol demanding medium information, a service according to this protocol can be provided.

In the embodiment, the control unit may perform control to transmit printing device information about the printing device that is USB-coupled, to the client via the first interface, when receiving a search request for the printing device from the client.

This enables the client to properly search for the printing device that is USB-coupled to the server.

In the embodiment, the printing device may include a plurality of the paper feeders. The control unit may perform control to acquire the medium information about the medium stored in each paper feeder of the plurality of the paper feeders.

This enables proper acquisition of the medium information even when the printing device including a plurality of paper feeders is the target.

In the embodiment, the control unit may receive print data from the client via the first interface. The control unit may control the second interface in such a way as to execute acquisition of the medium information preferentially over transmission of the print data.

This can restrain the transmission of the print data from obstructing the acquisition of the medium information.

In the embodiment, the control unit, even when receiving print data from the client via the first interface, may not transmit the print data to the printing device during a period from when an acquisition command for the medium information is transmitted to the printing device to when the medium information is acquired.

This can restrain the transmission of the print data from obstructing the acquisition of the medium information.

In the embodiment, the control unit may receive print data from the client via the first interface. The print data may be divided into first to n-th print data, n being an integer equal to or greater than 2. The control unit may transmit i-th print data, i being an integer satisfying 1≤i<n, subsequently transmit an acquisition command for the medium information to and receive the medium information from the printing device, and transmit (i+1)th print data after receiving the medium information.

This can restrain the transmission of the print data from obstructing the acquisition of the medium information.

In the embodiment, the first to n-th print data may be adjusted to a data volume that can be transmitted in a shorter period than an interval of transmission of the acquisition command.

This can restrain the transmission of the print data from obstructing the acquisition of the medium information.

In the embodiment, the control unit, when acquiring the medium information via the second interface, may manage version information of the medium information, based on a comparison between the acquired medium information and the medium information of the past stored in the storage unit.

This enables the server to manage the version of the medium information.

In the embodiment, the control unit may transmit the version information to the client via the first interface, and may transmit the medium information when receiving an acquisition request for the medium information from the client, based on the version information.

This enables the client to determine whether the medium information is updated or not, using the version information.

The printing system according to the embodiment includes a printing device and a server. The server includes: a first interface performing communication based on a predetermined protocol with a client; a second interface performing communication based on a USB (Universal Serial Bus) standard with the printing device; a control unit controlling the first interface and the second interface; and a storage unit. The control unit performs control to acquire medium information of a medium stored in a paper feeder of the printing device, via the second interface, and store the acquired medium information in the storage unit. When receiving an acquisition request for the medium information from the client via the first interface, the control unit performs control to read out the medium information from the storage unit and transmit the read-out medium information to the client via the first interface.

The technique according to this embodiment enables the transmission of the medium information of the printing device to the client, in the printing system providing the function of the printing device to the client, using a predetermined protocol. Thus, user burden can be reduced and print errors can be restrained. Also, even when the predetermined protocol is a protocol demanding medium information, a service according to this protocol can be provided.

While the embodiment has been described above in detail, a person skilled in the art can readily understand that various modifications can be made without substantially departing from the new patters and effects of the embodiment. Therefore, all such modifications are included in the scope of the present disclosure. For example, a term described along with a different term having a broader meaning or the same meaning, at least once in the specification or the drawings, can be replaced with the different term at any point in the specification or the drawings. All the combinations of the embodiments and modifications are included in the scope of the present disclosure. Also, the configuration and operation or the like of the server, the printing device, the client, and the printing system or the like are not limited to those described in the embodiment and can be modified in various manners.

What is claimed is:

1. A server comprising:
a first interface performing communication based on a predetermined protocol with a client;
a second interface performing communication based on a USB (Universal Serial Bus) standard with a printing device having at least one paper feeder;
a controller controlling the first interface and the second interface; and
a storage, wherein
the controller performs control to:
acquire medium information of a medium stored in the paper feeder of the printing device, via the second interface,
compare the acquired medium information with a past medium information of the printing device,
determine, based on the comparison, whether the acquired medium information is different from the past medium information, and
store the acquired medium information in the storage based on the determination that the acquired medium information is different from the past medium information, and
when receiving an acquisition request for the medium information from the client via the first interface, the controller performs control to read out the medium information from the storage and transmit the medium information to the client via the first interface.

2. The server according to claim 1, wherein
the controller performs control to transmit printing device information about the printing device that is USB-coupled, to the client via the first interface, when receiving a search request for the printing device from the client.

3. The server according to claim 1, wherein
the printing device includes a plurality of paper feeders, and
the controller performs control to acquire the medium information about the medium stored in each paper feeder of the plurality of paper feeders.

4. The server according to claim 1, wherein
the controller receives print data from the client via the first interface, and
the controller controls the second interface in such a way as to execute acquisition of the medium information preferentially over transmission of the print data.

5. The server according to claim 1, wherein
the controller,
even when receiving print data from the client via the first interface,
does not transmit the print data to the printing device during a period from when an acquisition command for the medium information is transmitted to the printing device to when the medium information is acquired.

6. The server according to claim 1, wherein
the controller receives print data from the client via the first interface,
the print data is divided into first to n-th print data, n being an integer equal to or greater than 2, and
the controller transmits i-th print data, i being an integer satisfying 1≤i<n, subsequently transmits an acquisition command for the medium information to and receives the medium information from the printing device, and transmits (i+1)th print data after receiving the medium information.

7. The server according to claim 6, wherein
the first to n-th print data are adjusted to a data volume that can be transmitted in a shorter period than an interval of transmission of the acquisition command.

8. The server according to claim 1, wherein
the controller, when acquiring the medium information via the second interface, manages version information of the medium information, based on the comparison between the acquired medium information and the past medium information in the storage.

9. The server according to claim 8, wherein
the controller transmits the version information to the client via the first interface, and transmits the medium information when receiving the acquisition request for the medium information from the client, based on the version information.

10. A printing system comprising:
a printing device having at least one paper feeder; and
a server,
the server including:
a first interface performing communication based on a predetermined protocol with a client;

a second interface performing communication based on a USB (Universal Serial Bus) standard with the printing device;
a controller controlling the first interface and the second interface; and
a storage, wherein
the controller performs control to:
acquire medium information of a medium stored in the paper feeder of the printing device, via the second interface,
compare the acquired medium information with a past medium information of the printing device,
determine, based on the comparison, whether the acquired medium information is different from the past medium information, and
store the acquired medium information in the storage based on the determination that the acquired medium information is different from the past medium information, and
when receiving an acquisition request for the medium information from the client via the first interface, the controller performs control to read out the medium information from the storage and transmit the medium information to the client via the first interface.

\* \* \* \* \*